(12) United States Patent
Zäuner et al.

(10) Patent No.: US 9,331,471 B2
(45) Date of Patent: May 3, 2016

(54) ARRANGEMENT FOR FORMING A THERMAL ISOLATION POINT

(75) Inventors: Edmund Zäuner, Berching/Pollanten (DE); Georg Wittmann, Lauterhofen (DE)

(73) Assignee: DEHN + SÖHNE GmbH + Co. KG, Neumarkt/Opf. (DE)

( * ) Notice: Subject to any disclaimer, the term of this patent is extended or adjusted under 35 U.S.C. 154(b) by 303 days.

(21) Appl. No.: 13/880,864

(22) PCT Filed: Oct. 17, 2011

(86) PCT No.: PCT/EP2011/068113
§ 371 (c)(1),
(2), (4) Date: Jun. 19, 2013

(87) PCT Pub. No.: WO2012/055720
PCT Pub. Date: May 3, 2012

(65) Prior Publication Data
US 2013/0265685 A1    Oct. 10, 2013

(30) Foreign Application Priority Data

Oct. 29, 2010   (DE) ......................... 10 2010 050 083
May 4, 2011   (DE) ......................... 10 2011 100 437

(51) Int. Cl.
*H02H 3/20*    (2006.01)
*H01C 7/12*    (2006.01)
(Continued)

(52) U.S. Cl.
CPC . *H02H 3/20* (2013.01); *H01C 7/12* (2013.01); *H01T 4/06* (2013.01); *H01T 4/08* (2013.01)

(58) Field of Classification Search
CPC ........... H02H 3/20; H01H 85/22; H01C 7/12; H01T 4/06; H01T 4/08
See application file for complete search history.

(56) References Cited

U.S. PATENT DOCUMENTS 3,636,612 A * 1/1972 Suprun .......................... 29/747
3,878,497 A * 4/1975 Spangler ...................... 337/295
(Continued)

FOREIGN PATENT DOCUMENTS

DE        29 519 313      1/1996         H01C 7/12
DE   20 2007 006 934      7/2007         H01T 4/08
(Continued)

OTHER PUBLICATIONS

Heat capacity, Wikipedia, Jun. 17, 2015, https://en.wikipedia.org/wiki/Heat_capacity, pp. 1-30.*
(Continued)

*Primary Examiner* — Zeev V Kitov
(74) *Attorney, Agent, or Firm* — Gerald T. Bodner

(57) ABSTRACT

The invention relates to an arrangement for forming a thermal isolation point, consisting of an isolation strip to which a prestressing force can be applied, an electrical means which produces thermal energy and has a contact surface, in particular in the form of an overvoltage protection element or a component of such an element, as well as an integral connection means, which changes when heated in a defined manner in the aggregate state, in particular a solder. According to the invention, an adapter part is provided between the isolation strip and the contact surface of the electrical means, wherein the adapter part can on the one hand be connected to the contact surface in a purely interlocking and/or force-fitting manner, and on the other hand is connected in a manner which can provide thermal isolation integrally to the isolation strip.

2 Claims, 9 Drawing Sheets

(51) Int. Cl.
*H01T 4/06* (2006.01)
*H01T 4/08* (2006.01)

(56) References Cited

U.S. PATENT DOCUMENTS 4,839,625 A * 6/1989 Newbery et al. ............... 337/166
7,483,252 B2 * 1/2009 de Palma et al. ............... 361/127

FOREIGN PATENT DOCUMENTS

| DE | 10 2006 042 028 | 9/2007 | ............... H01C 1/14 |
| DE | 10 2007 004 342 | 6/2008 | ............... H01T 1/14 |
| DE | 10 2008 026 555 | 12/2009 | ............... H01T 1/14 |
| WO | WO 2006/045946 | 5/2006 | ............... H01T 1/14 |
| WO | WO 2007/105066 | 9/2007 | ............... H01C 7/12 |

OTHER PUBLICATIONS

The International Search Report, in English, dated Feb. 16, 2012, the Written Opinion of the International Searching Authority, in English, dated Apr. 29, 2013, and the Notification Concerning Transmittal of International Preliminary Report on Patentability and the International Preliminary Report on Patentability, in English, dated Apr. 30, 2013, issued from Applicant's corresponding PCT Application No. PCT/EP2011/068113, filed on Oct. 17, 2011, each of which being from the World Intellectual Property Organization (WIPO).

* cited by examiner

ARRANGEMENT FOR FORMING A THERMAL ISOLATION POINT

The invention relates to an arrangement for forming a thermal isolation point, consisting of an isolation strip to which a preloading force can be applied, an electrical means which produces thermal energy and has a contact surface, in particular configured as an overvoltage protection element or as a component of such an element, and a material-closed connection means changing the aggregate state when heated in a defined manner, in particular a solder, according to the preamble of patent claim 1.

A pluggable overvoltage arrester having a housing to receive an arrester element is already known from DE 20 2007 006 934 U1. A thermal, spring-preloaded solder isolation point is formed between a connection arrester element and the associated connector. In addition, a disconnecting component is provided, which acts on the solder isolation point, transfers the preloading force and includes a state indicator.

One of the conductive connections comprises a switching tongue whose tongue end extends into the solder contact point. The switching tongue includes a current-sensitive target isolation point and has current-sensitive properties itself.

According to the solution described in this prior art, the connector, which quasi represents an isolation strip, is directly connected to an external connection of a predefined path by a soldered connection, i.e. in a material-closed manner. Therefore, the soldering process can only be realized after the assembly of the actual overvoltage arrester in the respective plug-in part, namely irrespective of the fact that a thermally conductive coupling plate having the mentioned solder extension is still located between the solder contact point and the overvoltage arrester element. Although this prior art solution allows the soldered connection with only a small amount of solder, a soldered connection between the switching tongue and the coupling plate to be performed in advance, in a separate working step is impossible. Moreover, the coupling plate has a great thermal capacity which is disadvantageous insofar as the solder is overheated during the soldering process, with the result of a deterioration of the electrical and mechanical properties of the solder itself and the material-closed connection realized by the solder.

In the overvoltage protection device comprising a thermal disconnection apparatus according to DE 10 2008 026 555 A1 disc-shaped varistors are used as overvoltage protection elements, with at least one varistor being assigned to each discharge path and the thermal isolation points being in series with the respective varistor.

The thermal isolation points each comprise a spring-preloaded clip which is electrically and mechanically connected to the respective varistor using a solder with a low melting point. The spring-preloaded clips are formed by a stamped and bent part which has finger-like extensions starting from a common connecting limb. At least one plug connection is provided on the connecting limb. The finger-like extensions have, in the region of the free end thereof, a slotted recess into which a connection wire and a connection leg of a varistor can directly be soldered.

This embodiment according to the prior art, too, initially requires the insertion of the disc-shaped varistors into the respective receiving chambers located in the housing of the device so as to realize the material-closed connections between the varistor and the limb.

In the disconnector for pluggable surge arresters according to DE 10 2006 042 028 B3 the disconnection point is likewise realized in the form of a thermally releasable soldered connection, namely between an outer connection contact of the arrester and a connection point of the at least one arrester element. Moreover, a preloading force acts on the soldered connection is the direction of disconnection.

According to the solution described there an outer connection contact is realized as a metallic formed part, which comprises an integral extension leg whose end pointing to the soldered connection has a U-shape. Moreover, the connection point of the arrester element is formed as a planar piece which is adjacent to a section of the U-shaped end of the formed part and is secured thereto by a solder. The metallic formed part is subject to an inherent spring preload and a finger subject to a spring preload and mounted on a guide engages into the space formed and encompassed by the U-shape of the formed part section in order to bring about a quick and secure electrical separation of the soldered connection when triggered, both by supporting the separation movement of the formed part and the displacement of the solder material.

In this prior art, too, the required soldered connection can be accomplished only after the complete assembly of the functionally essential elements of the pluggable overvoltage arrester. This involves the risk that fluxing agent needed for the soldering process comes in contact with sensitive areas of the arrester or that the solder is deposited in undesired places or areas during the soldering process.

According to the utility model DE 295 19 313 U1 an overvoltage arrester having a lower part is proposed, which is electrically connected to the ingoing and outgoing lines of the plant to be protected. Moreover, a plug-in part is provided which comprises at least one varistor which can be detachably and, thus, electrically connected to the lower part by a mechanical plug-in connection.

The plug-in part is provided with a thermal trip in case the varistor is intolerably heated. The plug-in part is provided with a supporting wall such that the varistor is located on a side face of the supporting wall, and the thermal trip as well as associated switching means are located on the other side face of the supporting wall, the thermal trip being opposite to the varistor. The plug-in part is in particular trough-shaped, the bottom of the trough defining the aforementioned supporting wall.

According to this prior art the thermal disconnection device can be soldered only after the assembly of the carrier part. In addition, a high energy input is required as the varistor with its connecting lug, too, has to be sufficiently heated during the soldering process.

Based on the foregoing it is the object of the invention to provide a further developed arrangement for forming a thermal isolation point which ensures a very high and reproducible quality of the material-closed, in particular soldered connection. In addition, a possibility is to be created to realize the material-closed, in particular soldered connection in a separate working step that does not require that the isolation point is already located, for instance, inside a plug-in part of an overvoltage arrester.

The solution to the object of the invention is achieved by a combination of the features of patent claim 1. The dependent claims describe at least useful embodiments and further developments.

Accordingly, an arrangement for forming a thermal isolation point is provided, consisting of an isolation strip to which a preloading force can be applied. In addition, an electrical means is provided, which produces thermal energy and has a contact surface and, in particular, is configured as an overvoltage protection element or as a component of such an element. Essential for the function is, moreover, a material-closed connection means changing the aggregate state when heated in a defined manner, in particular a solder. According to the invention an adapter part is provided between the isolation strip and the contact surface of the electrical means, wherein the adapter part can on the one hand be connected to the contact surface in a purely form-closed and/or force-closed manner and, on the other hand, is connected to the isolation strip in a material-closed, thermally disconnectable manner.

In one embodiment, the adapter part is formed of a highly heat-conducting material. Preferably, the adapter part is connected to the isolation strip by soldering and, to this end, has an optimized material composition and/or soldering surface.

According to the invention the isolation strip with the adapter part is fabricated in a first working step. After the production of the material-closed connection the form-closed and/or force-closed connection is realized in a purely mechanical manner in a second, separate step.

This measure helps to achieve a disconnection device for two closely adjacent varistors and couple these varistors to same in a thermally optimal manner, without a soldering step taking place in the available narrow space.

Thus, the provided disconnection device may also be positioned inside an overvoltage protection module, i.e. used in a location where no access for tools, e.g. a soldering bit, is provided. This means that a positioning in the overvoltage protection module can be achieved that is optimal in terms of the response behavior, without the need to take into account production-orientated measures.

Thus, the treatment, which is critical both under the aspect of the required thermal energy to be produced and developing vapors caused by the fluxing agent, can be performed in a separate place. The so produced intermediate product, comprising at least the aforementioned isolation strip and the adapter part, may be cleaned, if necessary surface-treated and, checked with respect to the soldered connection, held available for the further handling.

According to the invention the adapter part comprises at least one crimp section or bent section which mechanically receives at least one connecting lug or connecting tongue of the electrical means. The adapter part may be formed, for instance, as a single or multiple female disconnect.

In a further development of the invention the adapter part comprises a stack of electrically connected crimp sections or bent sections, wherein the material-closed connection region is formed on one stack surface.

In another further development of the invention at least two crimp sections or bent sections are provided opposite each other in one plane so as to receive on both sides at least one connecting lug or connecting tongue of the electrical means.

In one embodiment the adapter part may have a very low thermal capacity relative to the formation of the material-closed connection to the isolation strip, so that no excessive thermal energy is required for the melting and performing the soldering process.

The invention will be explained in more detail below by means of an embodiment and with reference to the figures.

Figure 1:
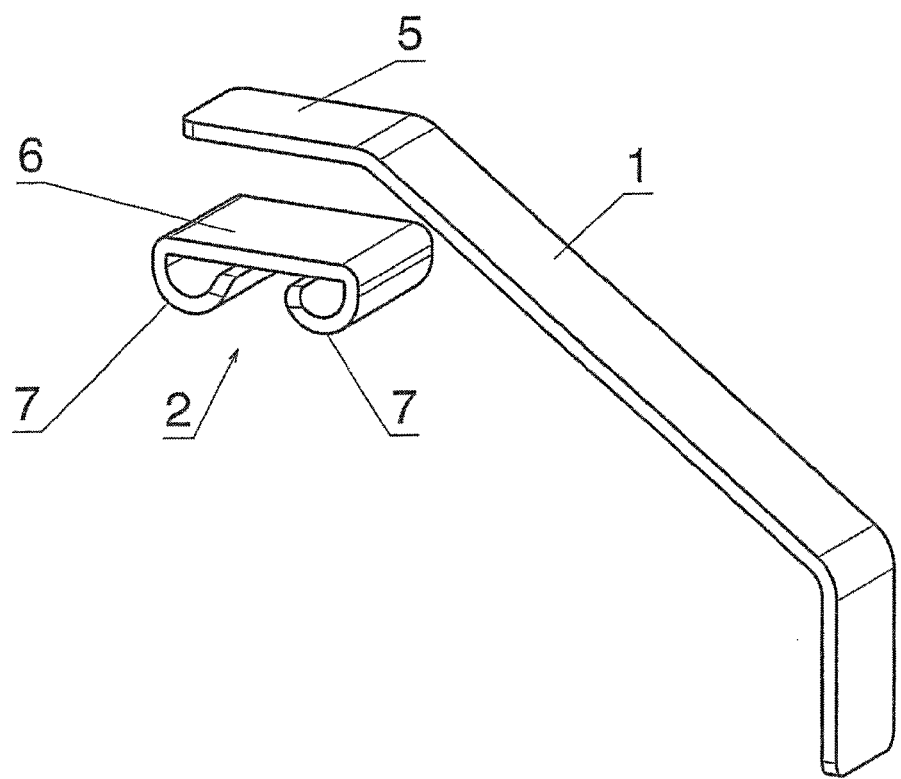
FIG. 1 shows a basic embodiment of an isolation strip as well as an exemplary adapter part still in a separated state, i.e. not connected in a material-closed manner.

The illustration according to FIG. 1 shows an isolation strip 1 which is, for instance, angled and either has its own spring-elastic properties or can be connected to a preloading spring (not shown).

An angled section 5 defines a surface for accomplishing a material-closed, in particular soldered connection which represents a thermal isolation point in later use.

An adapter part 2 according to the invention also has a material-closed connection surface 6 which, for the purpose of accomplishing the soldered connection, points towards surface 5 of the isolation strip 1.

Figure 3:
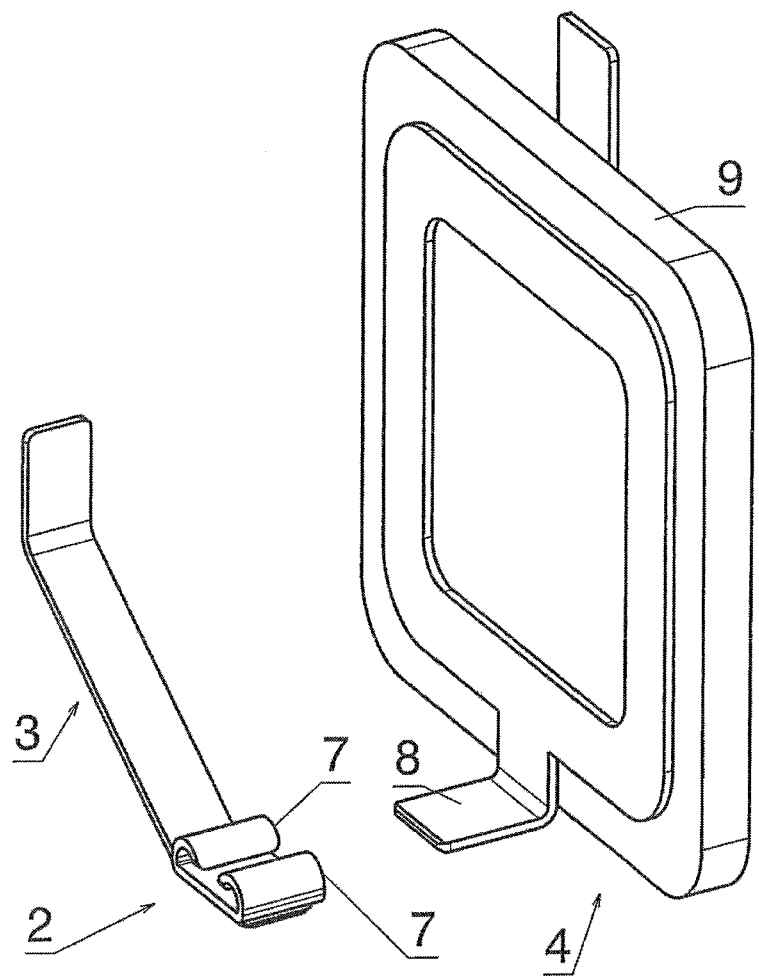
FIG. 3 shows an illustration of the isolation strip soldered to the adapter part, the adapter part being formed as a female disconnect so as to receive a connecting lug of a disc-shaped varistor.

Two crimp sections or bent sections 7 are provided opposite surface 6, which serve to receive a contact tongue 8, for instance, of a disc-shaped varistor 9 (see FIG. 3). The adapter part 2 may be produced and configured to obtain an optimal surface for the soldering process.

Figure 2:
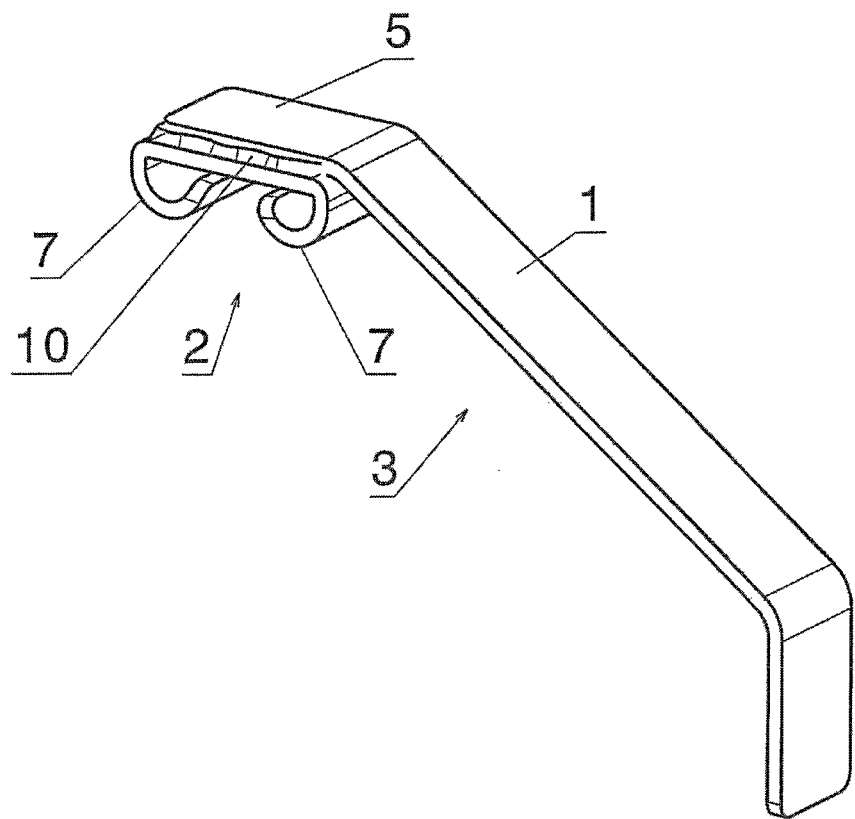
FIG. 2 shows an illustration of the accomplished material-closed, in particular soldered connection between the isolation strip and the corresponding soldering surface of the adapter part.

FIG. 2 shows the representation of the result of the soldered connection between the adapter part 2 and the isolation strip 1. The solder is here symbolically designated with reference number 10.

The soldered unit 3 being a prefabricated part can now be cleaned so as to remove residues of fluxing agent, and is available for the further handling.

Figure 4:
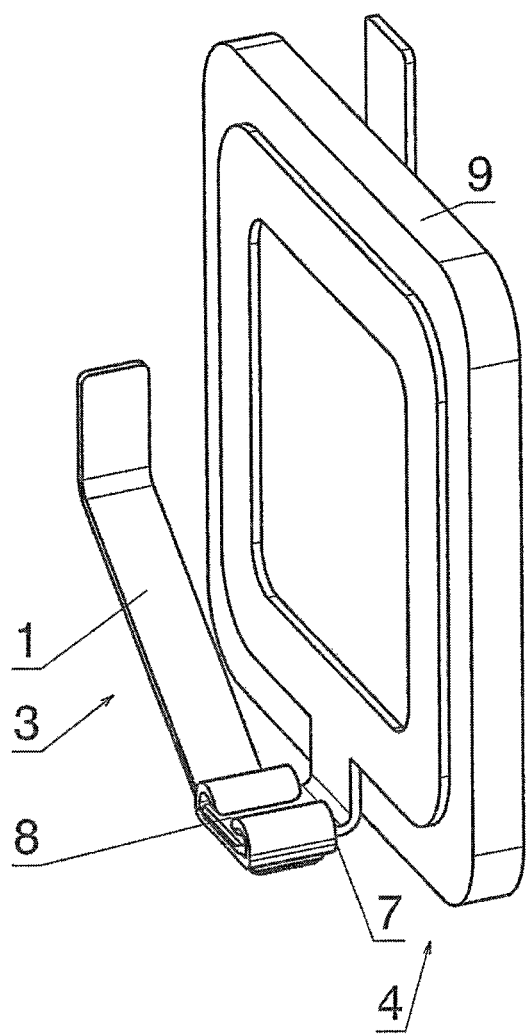
FIG. 4 shows the state after the connecting lug or connecting tongue of the varistor has been completely inserted into the female disconnect type adapter part.

The combination of FIGS. 3 and 4 shows the mechanical contacting and connecting step between the soldered unit 3 and the connecting tongue 8 of the varistor 9. In this step, another premounted unit is produced, now comprising the isolation strip, the thermal isolation point and the varistor.

In the following FIGS. 5 to 9 the above-explained principle of forming a material-closed connection between the isolation strip 1 and the adapter part 2 is used again. In contrast to the illustrations according to FIGS. 1 to 4 the adapter part is provided with multiple crimp sections or bent sections 7, however, so that multiple connecting lugs or connecting tongues 8 of correspondingly arranged varistors 9 can be received.

Figure 5:
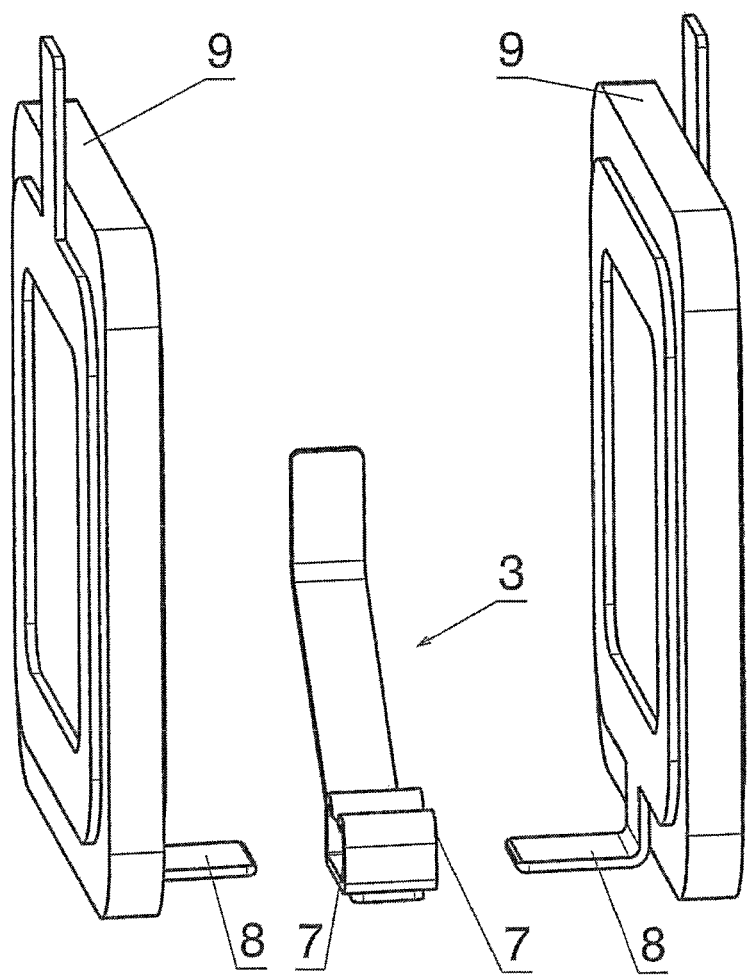
FIG. 5 shows an illustration of an adapter part that was already connected to the isolation strip in a material-closed manner, wherein the adapter part was configured such that a connecting lug or connecting tongue of a respective disc-shaped varistor can be mechanically connected and, thus, electrically contacted by insertion on opposite sides.
Figure 6:
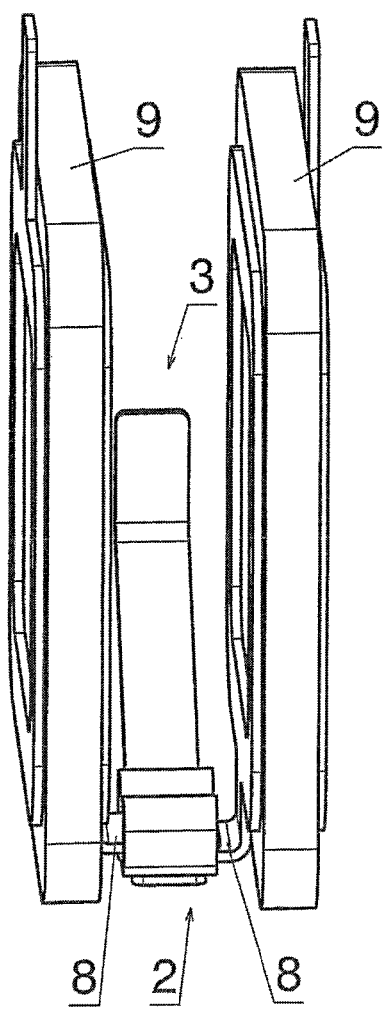
FIG. 6 shows an illustration depicting the result of the mechanical connection of FIG. 5.

As can be seen in FIG. 5, a connecting tongue 8 of a respective varistor 9 is respectively inserted into the centrally arranged soldered unit 3 on the left and right sides, thereby establishing a mechanical connection and an electrical contact therewith. In the final state an arrangement according to the illustration shown in FIG. 6 is obtained.

Figure 7:
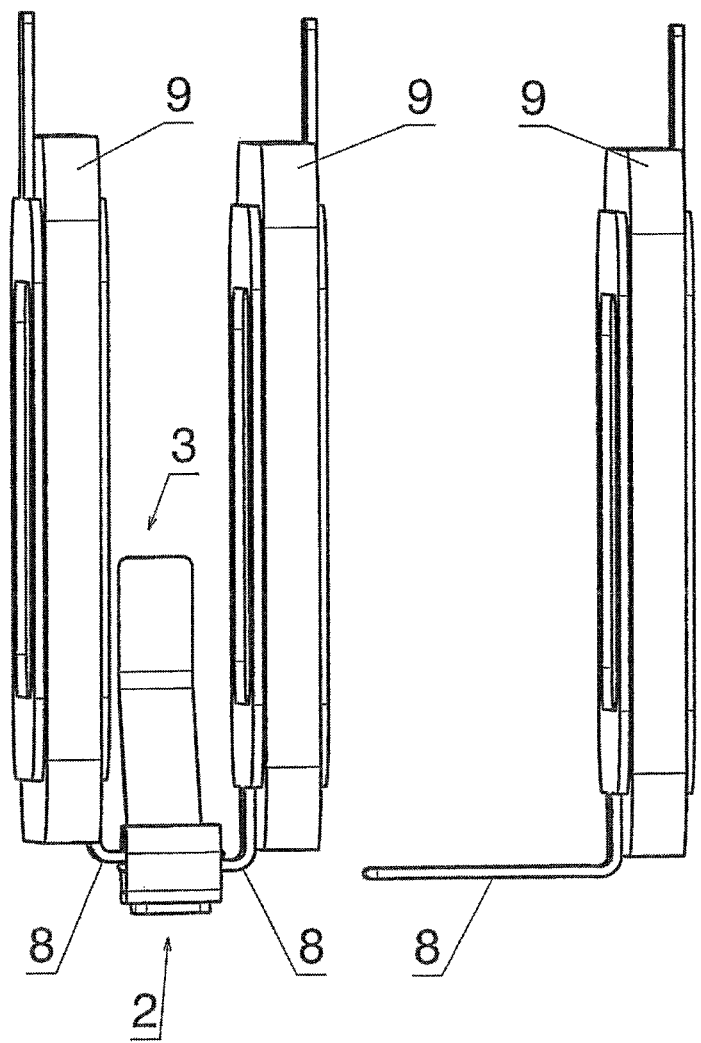
FIG. 7 shows an embodiment comprising a multiple adapter part which is capable of mechanically and, thus, electrically receiving three connecting lugs of three disc-shaped varistors.
Figure 8:
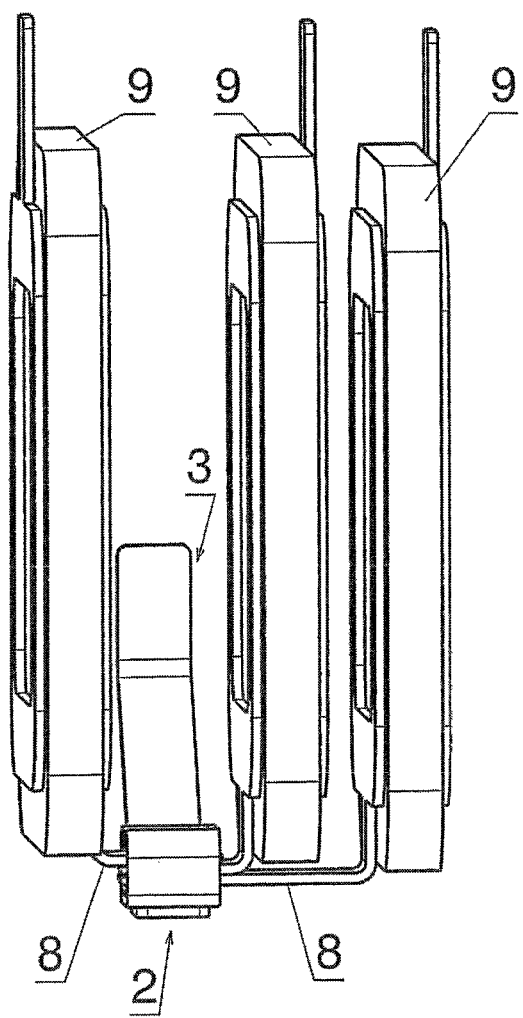
FIG. 8 shows an illustration of the mechanical connection process of FIG. 7.
Figure 9:
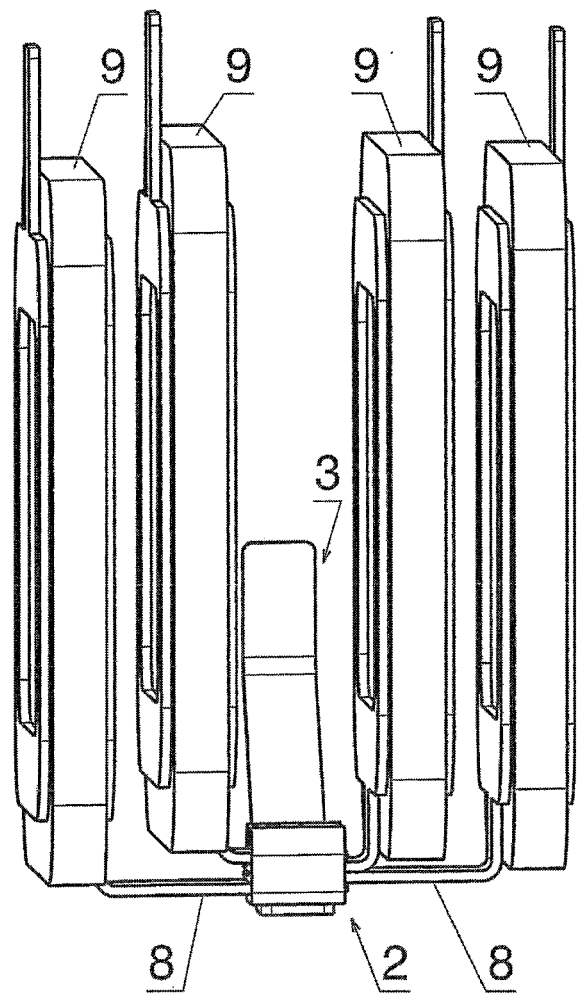
FIG. 9 shows another illustration similar to the one of FIG. 8, wherein a fourth connecting lug or connecting tongue of a fourth varistor is inserted in a corresponding crimp region or female disconnect region of the adapter, respectively.

If the adapter part is configured correspondingly it is possible to receive additional varistors with connecting lugs or connecting tongues 8 extended to this effect, which is shown in FIGS. 7 to 9, without departing from the basic principle of the invention.

Due to the fact that unit 3 can be completed separately prior to the production of a complete overvoltage arrester along with the housing soldering techniques may be used, e.g. inductive soldering, which are not only highly productive but, in addition to that, do not have a negative influence on the long-term properties of the soldering material.

Summarizing, the following advantages are obtained by the invention.

In terms of its design the adapter part can be optimally adapted, and configured correspondingly, to the respective soldering process. The possibility is provided to prefabricate the actual thermal disconnection device in a separate working step. With respect to the prior art the reproducible energy input for the soldering process is smaller and always the same. Thus it is possible to largely automate the soldering process.

As is easily comprehensible, in particular by means of the embodiments, a high degree of standardization relative to the prefabricated disconnection device can be achieved, which facilitates the stock-keeping. Impurities caused by fluxing agents, residues of soldering paste or the like, which are normally present in the final product, i.e. in the finally produced overvoltage protection module and the housing thereof, are precluded because the soldering process is realized outside the final application.

The invention claimed is:

1. Arrangement for forming a thermal isolation point, consisting of an isolation strip to which a preloading force can be applied, an overvoltage protection element or a component thereof which produces thermal energy and has a contact surface and a material-closed connection means changing the aggregate state when heated in a defined manner, in particular a solder, characterized in that an adapter part is provided between the isolation strip and the contact surface of the overvoltage protection element or a component thereof, wherein the adapter part can on the one hand be connected to the contact surface in a purely form-closed and/or force-closed manner and, on the other hand, is connected to the isolation strip in a material-closed, thermally disconnectable manner, wherein the isolation strip with the adapter part is fabricated in a first working step, and that after the production of the material-closed connection the form-closed and/or force-closed connection is realized in a mechanical manner in a second, separate step.

2. Arrangement for forming a thermal isolation point, consisting of an isolation strip to which a preloading force can be applied, an overvoltage protection element or a component thereof which produces thermal energy and has a contact surface and a material-closed connection means changing the aggregate state when heated in a defined manner, in particular a solder, characterized in that an adapter part is provided between the isolation strip and the contact surface of the overvoltage protection element or a component thereof, wherein the adapter part can on the one hand be connected to the contact surface in a purely form-closed and/or force-closed manner and, on the other hand, is connected to the isolation strip in a material-closed, thermally disconnectable manner, wherein the adapter part comprises at least one crimp section or bent section which receives at least one connecting lug of the overvoltage protection element or a component thereof, and wherein the adapter part comprises a stack of electrically connected crimp sections or bent sections, wherein the material-closed connection region is formed on one of the stack surfaces.

* * * * *